(12) United States Patent
Drake et al.

(10) Patent No.: US 7,331,167 B1
(45) Date of Patent: Feb. 19, 2008

(54) MOW/SPEED INTERLOCK SYSTEM FOR RIDING MOWERS

(75) Inventors: Jeffrey T. Drake, Richfield, MN (US); Gregory M. Kostik, Minneapolis, MN (US)

(73) Assignee: The Toro Company, Bloomington, MN (US)

( * ) Notice: Subject to any disclaimer, the term of this patent is extended or adjusted under 35 U.S.C. 154(b) by 25 days.

(21) Appl. No.: 11/218,339

(22) Filed: Sep. 1, 2005

(51) Int. Cl.
*A01D 41/14* (2006.01)

(52) U.S. Cl. .............................. 56/10.2 R; 56/10.2 G; 56/10.8

(58) Field of Classification Search ............ 56/10.2 R, 56/10.2 G, 10.8, 11.8, 14.7, 14.8, 16.7
See application file for complete search history.

(56) References Cited

U.S. PATENT DOCUMENTS 2,841,033 A * 7/1958 Fields ......................... 74/526
4,543,850 A * 10/1985 Bednar et al. ................ 74/512
5,497,604 A * 3/1996 Lonn ....................... 56/10.2 H

* cited by examiner

Primary Examiner—Thomas A. Beach
Assistant Examiner—Mai T Nguyen
(74) Attorney, Agent, or Firm—James W. Miller

(57) ABSTRACT

A mower has at least one powered cutting unit for mowing grass. A switch is provided for permitting operation of the cutting unit or for preventing operation of the cutting unit depending upon the state of the switch. The switch is linked in some fashion, e.g. mechanically or electronically, to the traction drive system of the unit. The ground speed of the mower is limited to a mowing speed when the switch is placed into the state in which operation of the cutting unit is permitted. When the switch is placed into the state in which operation of the cutting unit is prevented, the ground speed of the mower is not limited to the mowing speed but can attain a higher transport speed.

12 Claims, 4 Drawing Sheets

MOW/SPEED INTERLOCK SYSTEM FOR RIDING MOWERS

TECHNICAL FIELD

This invention relates to self-propelled, riding mowers.

BACKGROUND OF THE INVENTION

Various types of riding mowers are well known. For example, riding mowers are used for cutting grass on golf courses, parks, cemeteries, stadiums, school grounds, and other venues having relatively large areas of turf. Riding mowers are so named because they are driven and operated by an operator who is carried on or "rides on" the mower as opposed to a walk mower in which the operator walks on the ground behind the mower.

Riding mowers can carry different types of grass cutting units. For example, reel cutting units are often used when close or precision cutting of grass is required, such as on golf greens. Such reel cutting units comprise a rotatable cutting reel that sweeps the grass against a sharpened bedknife to cut the grass. Alternatively, riding mowers also employ rotary cutting decks which carry one or more cutting blades that rotate in horizontal cutting planes to cut the grass. Rotary cutting decks are more often used when very high precision grass cutting is not required.

The ground speed of riding mowers is typically controlled by a variable speed traction drive system that includes an accelerator of some type. The accelerator is often a foot operated pedal, though hand operated accelerator levers have also often been used. The ground speed of the mower increases as the accelerator is advanced. For example, when the accelerator comprises a foot pedal, the more the foot pedal is depressed by the operator, the faster the mower travels.

In addition, the ground speed of the mower is usually infinitely adjustable between zero and an absolute maximum ground speed corresponding to a position of maximum accelerator advancement. The absolute maximum ground speed of the mower is usually a relatively fast transport speed that allows the mower to be driven relatively quickly between different work areas, e.g. from one golf green to the next golf green. However, the quality of cut degrades, whether the mower is equipped with reel or rotary cutting units, if one attempts to mow at the relatively fast transport speed. In addition, if the operator should inadvertently run a cutting unit into some type of obstacle while traveling at the transport speed, the cutting unit is often severely damaged.

The operators of riding mowers are often instructed by their supervisors or bosses, e.g. by a golf course superintendent or by a commercial mowing contractor, to mow at a slower mowing speed and to use the higher transport speed only when travelling between work sites. If this instruction is followed, then the mower will deliver the quality of cut for which it was designed and the risk of severely damaging the cutting units will be greatly reduced. Unfortunately, however, this instruction is sometimes ignored by the mower operator, particularly when the supervisor or boss is out of sight and is not visually observing the operation of the mower. The mower operator usually has an interest in finishing as quickly as possible, especially when mowing under adverse weather conditions. Such mower operators often follow the natural temptation to mow even when driving the mower at its transport speed.

Thus, there is a need in the art, unmet until the present invention, to provide some system that allows an operator to mow only when the mower is travelling at the slower mowing speed and not at the higher transport speed.

SUMMARY OF THE INVENTION

One aspect of this invention relates to a riding mower which comprises a self-propelled frame supported for movement over the ground by a plurality of wheels. The frame is capable of being driven at a variable ground speed from zero up to an absolute maximum ground speed. An operator's station is provided on the frame for carrying an operator who drives and operates the mower. At least one cutting unit is operatively coupled to the frame for mowing grass. A selectively advanceable accelerator at the operator's station allows the operator to select a desired ground speed for the frame. A means is provided for allowing the operation of the cutting unit(s) only when the mower is travelling at a mowing speed that is less than the absolute maximum ground speed of the frame.

Another aspect of this invention relates to an improved riding mower of the type comprising a frame that is self propelled by a traction system capable of providing a variable ground speed. A cutting unit for mowing grass is coupled to the frame. The traction drive system includes an accelerator that is selectively movable by the operator of the riding mower to control a forward ground speed of the riding mower. The accelerator has a path of travel between a neutral position in which the forward ground speed of the riding mower is zero and a position of maximum advancement in which the forward ground speed of the riding mower is at an absolute maximum forward ground speed. The improvement relates to an interlock system which comprises an accelerator stop movably carried on the frame of the riding mower and movable between an operating position in which the accelerator stop is interposed into the path of travel of the accelerator and a non-operating position in which the accelerator stop is clear of the path of travel of the accelerator. The accelerator stop in the operating position limits advancement of the accelerator to something short of the maximum advancement position to limit the forward ground speed of the riding mower to a mowing speed that is above zero but less than the absolute maximum forward ground speed. A switch has an operating state when the accelerator stop is in the operating position and a non-operating state when the accelerator stop is in the non-operating position. The switch enables operation of the cutting unit when the switch is in the operating state and disables operation of the cutting unit when the switch is in the non-operating state.

Another aspect of this invention relates to an interlock system for a self-propelled mower to which a powered cutting unit for mowing grass is coupled. The unit also includes a traction drive system for propelling the unit at a variable ground speed. The traction drive system includes an accelerator that is selectively advanceable by an operator to vary the forward ground speed of the unit. The interlock system comprises a switch that is selectively actuable to be disposed either in an operating state in which operation of the cutting unit is enabled or in a non-operating state in which operation of the cutting unit is disabled. An operative link is provided between the switch and at least a portion of the traction drive system for limiting the maximum forward ground speed provided by the traction drive system depending upon the state of the switch. The maximum forward ground speed in the operating state of the switch is less than the maximum forward ground speed in the non-operating state of the switch.

BRIEF DESCRIPTION OF THE DRAWINGS

This invention will be described more completely in the following Detailed Description, when taken in conjunction with the following drawings, in which like reference numerals refer to like elements throughout.

DETAILED DESCRIPTION

Figure 1:
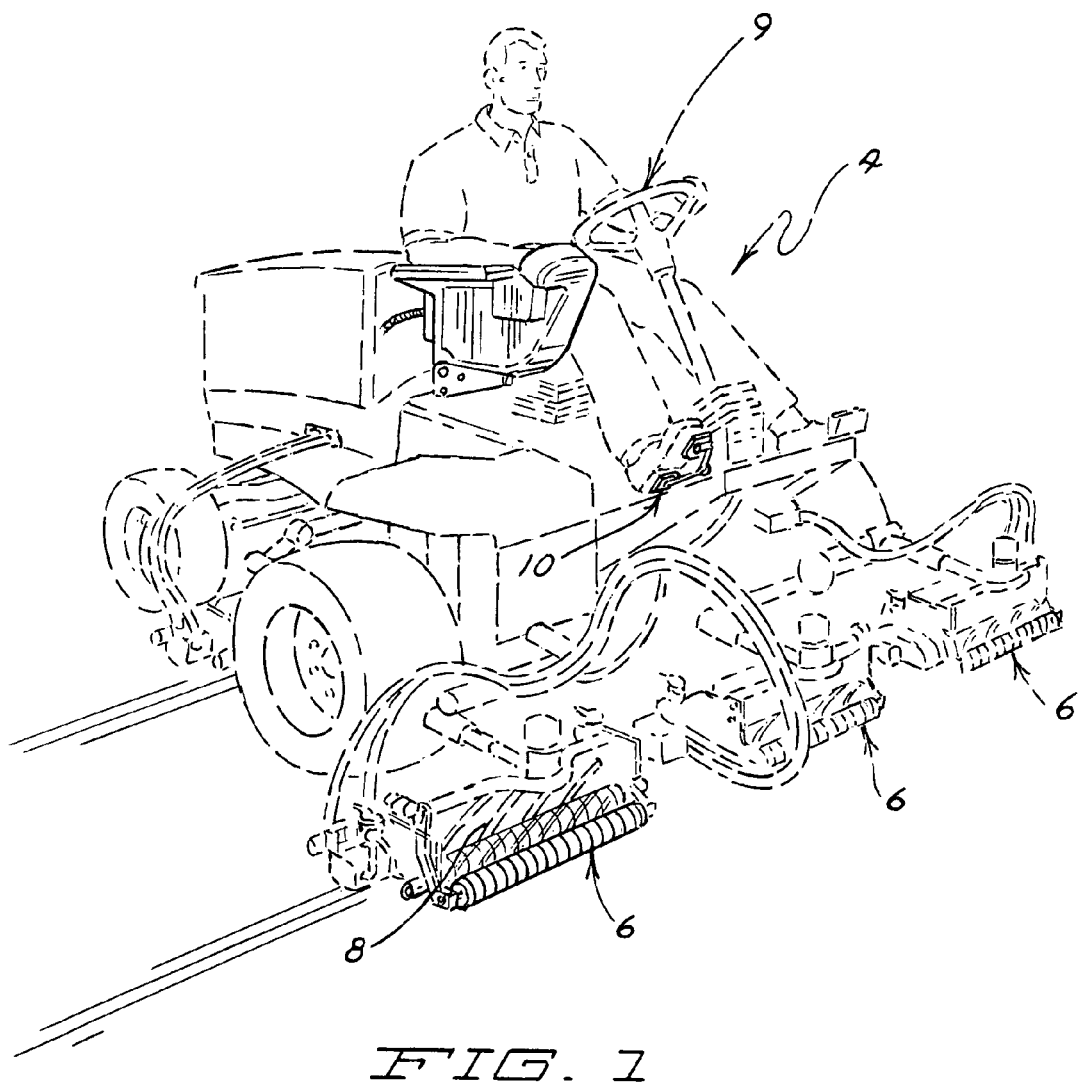
FIG. 1 is a perspective view of one example of a riding mower with which the interlock system of this invention may be used.

FIG. 1 shows a mower 4 that carries a plurality of reel cutting units 6 for mowing grass. Each reel cutting unit 6 includes a transversely arranged rotatable cutting reel 8 that sweeps grass against a sharpened bedknife (not shown) to sever the same. Mower 4 can carry a greater or fewer number of reel cutting units 6 than those shown herein, and such reel cutting units 6 could be disposed in other locations. In addition, reel cutting units 6 could be replaced with single or multi-bladed rotary cutting decks.

As further shown in FIG. 1, mower 4 includes an operator's station 9 in which an operator of mower 4 is carried. Operator's station 9 includes a seat for carrying a seated operator, but could also include a platform for supporting a standing operator. The operator drives mower 4 and operates reel cutting units 6 using any suitable controls of the type found on mowers 4. Mower 4 has a traction drive system that self propels mower 4 over the ground. This traction drive system includes an accelerator 10 that controls or sets the forward ground speed of mower 4.

Figure 2:
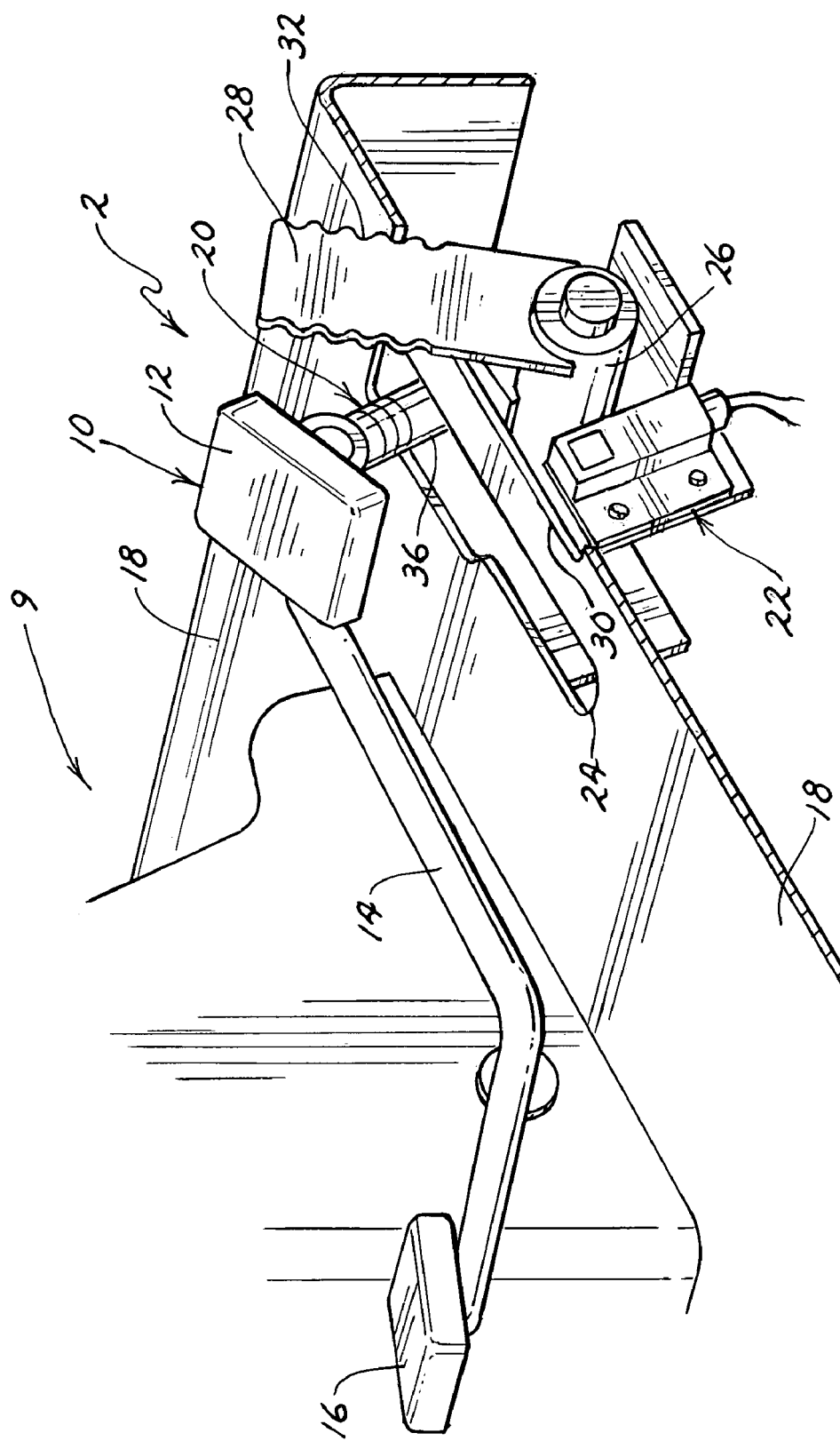
FIG. 2 is a perspective view of the interlock system of this invention, particularly illustrating the interlock system in an operating position in which powered operation of the cutting units carried by the mower is enabled because the range of travel of the accelerator is limited compared to its nominal full range of travel.
Figure 3:
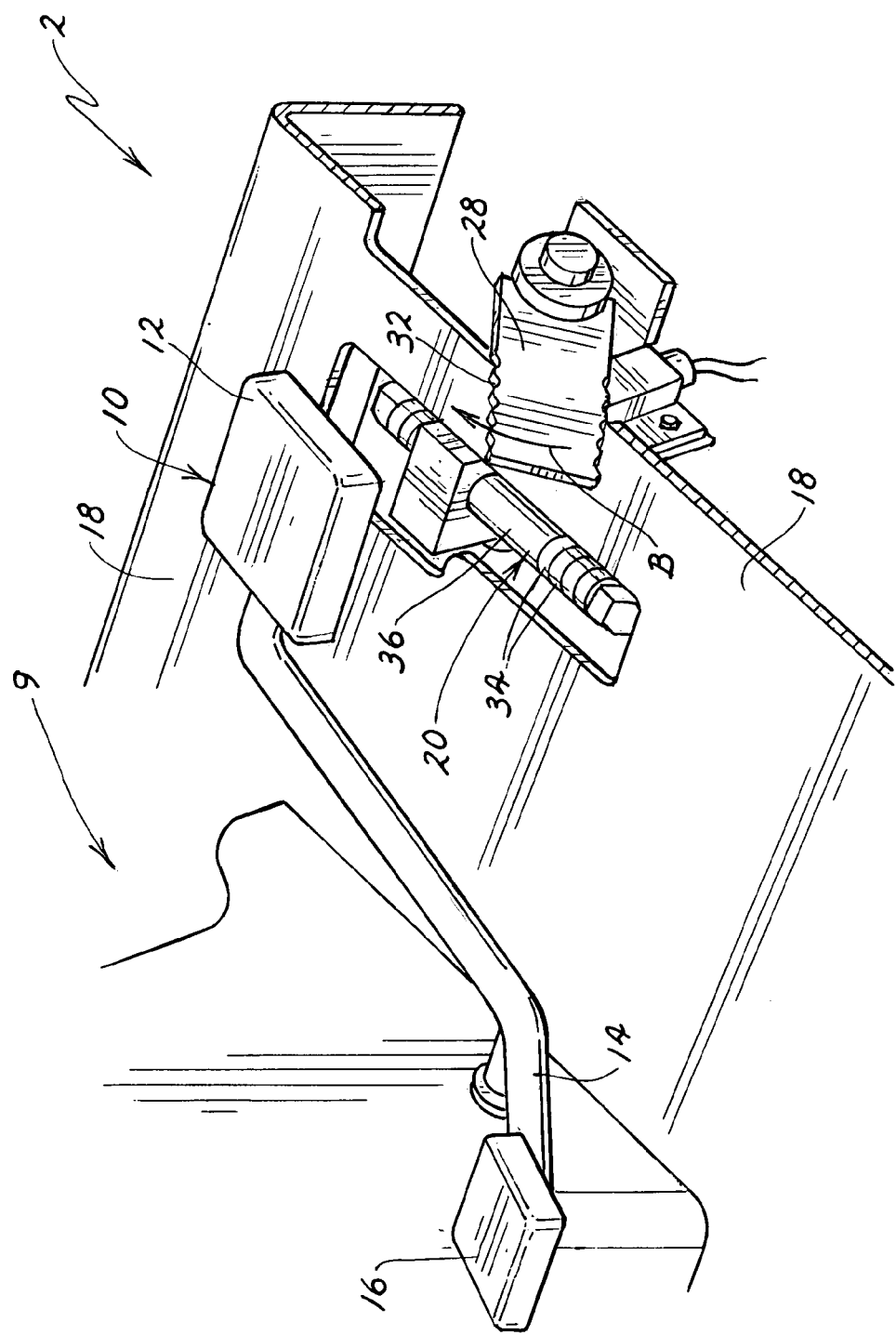
FIG. 3 is a perspective view similar to FIG. 2 of the interlock system shown in FIG. 2, particularly illustrating the interlock system in a non-operating position in which powered operation of the cutting units carried by the mower is disabled because the range of travel of the accelerator is unrestricted such that the accelerator can travel over its nominal full range of travel.
Figure 4:
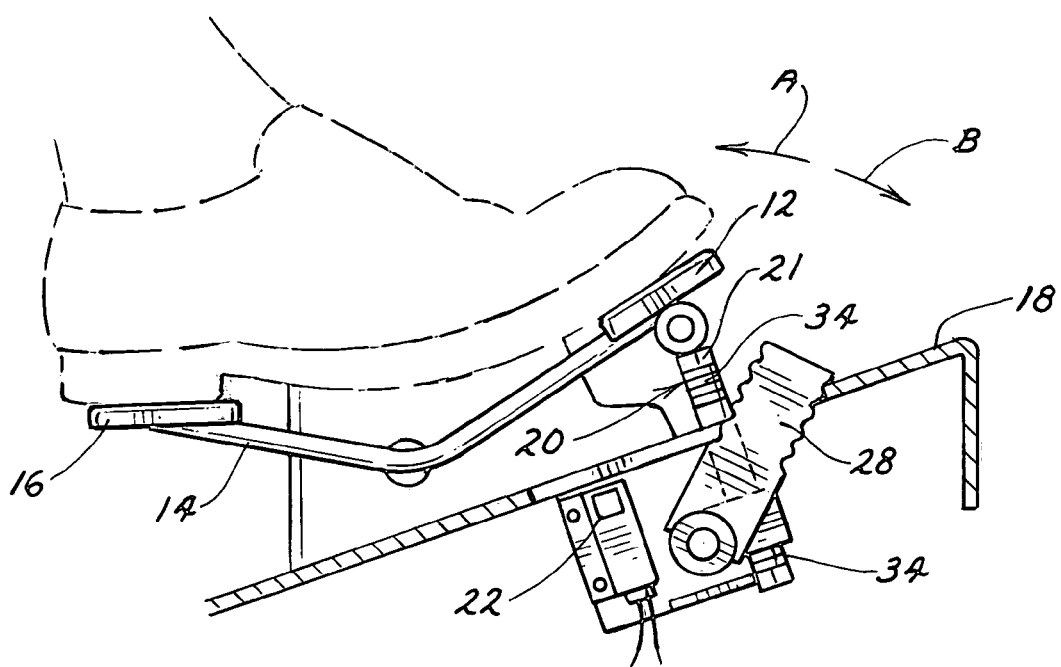
FIG. 4 is a side elevational view of the interlock system of this invention shown in the operating position of FIG. 2.

As shown more particularly in FIGS. 2-4, accelerator 10 preferably comprises a forward foot pedal 12 carried on a pivotal lever 14. Forward pedal 12 is engaged by the toes of the operator's foot while the heel of the operator's foot rests on a rearward foot pedal 16 carried at the other end of lever 14. There is some type of neutral spring or return to neutral system (not shown) for normally positioning lever 14 in a neutral position where mower 4 is at rest and is not being propelled either forwardly or rearwardly.

Figure 5:
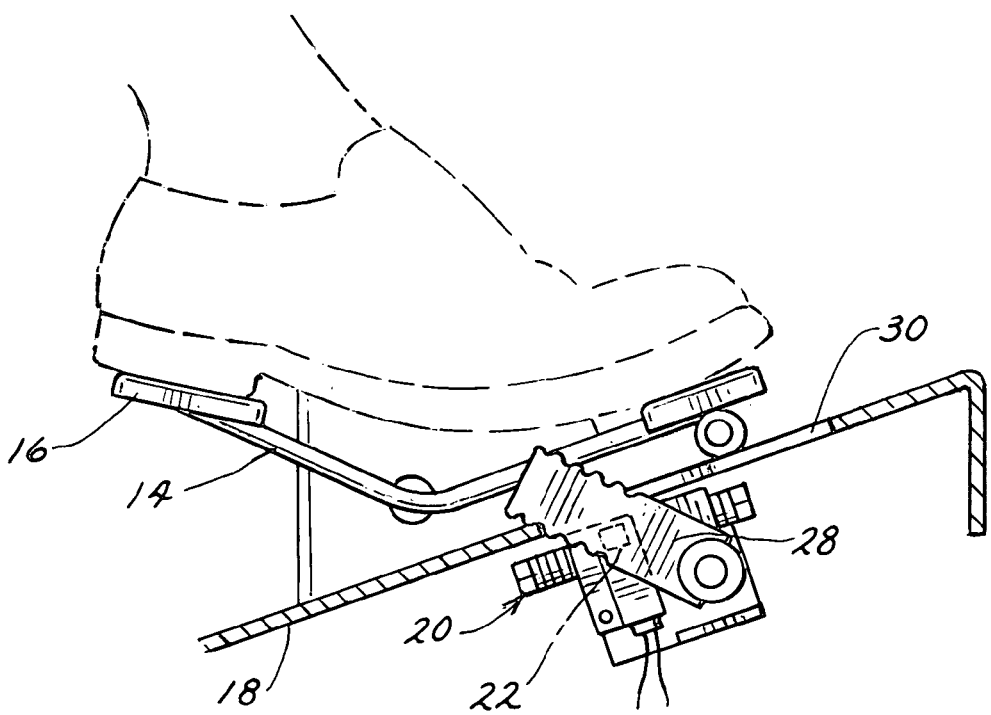
FIG. 5 is a side elevational view similar to FIG. 4 showing the interlock system of this invention in the non-operating position of FIG. 3.

The operator selects a forward direction of motion for mower 4 by depressing forward pedal 12 with the toes of the operator's foot. When forward pedal 12 has been depressed through its full range of travel as shown in FIG. 5, mower 4 will be driven at its absolute maximum forward ground speed, which is a speed suitable for high speed transport of mower 4 from one work site to another. When forward pedal 12 is depressed only partially and reaches only an intermediate position between the neutral position of lever 14 and floorboard 18, a slower speed that is appropriate for mowing will be provided by the traction drive system.

This invention comprises an interlock system, shown generally as 2, for enabling the operation of cutting units 6, whether such cutting units 6 be reel or rotary cutting units, only when the maximum ground speed of mower 4 is limited to the slower mowing speed. Interlock system 2 comprises a link to the traction drive system in the form of a pedal stop 20. Interlock system also comprises an interlock switch 22.

Switch 22 is fixed on mower 4 beneath floorboard 18. Pedal stop 20 is movable on mower 4 from an operating position in which pedal stop 20 projects at least partially through a slot 24 in floorboard 18 to a non-operating position in which pedal stop 20 is retracted within slot 24 and is located beneath floorboard 18. FIGS. 2 and 4 show the operating position of pedal stop 20. FIGS. 3 and 5 show the non-operating position of pedal stop 20.

Pedal stop 20 is carried on a pivot rod 26 with pivot rod 26 being located beneath floorboard 18. In addition, pivot rod 26 carries an upwardly projecting lever 28 that sticks up through another slot 30 in floorboard 18. Lever 28 is preferably foot actuated. The front and rear edges of lever 28 are notched as shown at 32 to allow the operator's foot to more securely engage lever 28 for foot activation of lever 28.

When pedal stop 20 is in its operating position, the front edge of lever 28 engages against the front edge of slot 30 as shown in FIG. 4. Similarly, when pedal stop 20 is in its non-operating position, the rear edge of lever 28 engages against the rear edge of slot 30 as shown in FIG. 5. Clearly, pedal stop 20 moves back and forth between the operating and non-operating positions by the pivoting of pivot rod 26 back and forth as represented by the arrows A and B in FIG. 4.

When pedal stop 20 is in its non-operating position as shown in FIGS. 3 and 5, switch 22 is in a non-operating state which prevents cutting units 6 from operating. Switch 22 can be a spring biased plunger type switch that would be placed in the non-operating state by having some type of abutment linked to pedal stop 20 engage the switch plunger to depress the plunger. Alternatively, and as shown herein, switch 22 can be an electronic switch having some characteristic, such as capacitance, that is changed when lever 28 is immediately adjacent switch 22, as shown in FIGS. 3 and 5, in the non-operating position of pedal stop 20. The state of switch 22 in the non-operating position of pedal stop 20, i.e. whether switch 22 is open or closed in an electrical sense, is not important to this invention.

When pedal stop 22 is in the non-operating position, pedal stop 22 is retracted beneath floorboard 18 and does not in any way interfere with motion of forward pedal 12. The operator is free to depress forward pedal 12 through its full range of travel in order to produce the absolute maximum speed of mower 4. But, with pedal stop 22 in this retracted position, cutting units 6 will not operate. The operator cannot mow if the operator wishes to drive mower 4 at its relatively high transport speed.

The only way to mow is for the operator to use lever 28 to pivot pedal stop 22 forwardly in the direction of arrow B from the non-operating position shown in FIGS. 3 and 5 into the operating position shown in FIGS. 2 and 4. In this position, pedal stop 20 now projects up out of slot 24 such that the upper end 21 of pedal stop 20 now underlies forward pedal 12 and is positioned between the neutral position of lever 14 and floorboard 18. This limits the operation of mower 4 to the lower mowing speed since pedal stop 20 limits how far the operator can depress forward pedal 12 towards floorboard 18.

In addition, lever 28 has moved away from switch 22, which is sensed by switch 22, and which causes switch 22 to change states and to be placed into the operating state of switch 22. In the operating state, switch 22 permits the operation of cutting units 6. Mowing can now take place, but only at ground speeds that do not exceed the lower mowing speed.

A boss or supervisor can set or establish a predetermined mowing speed by how far the upper end 21 of pedal stop 20 projects above floorboard 18 in the operating position of pedal stop 20. This is done by moving spacers 34 from the top to the bottom of a lug 36 secured to pivot rod 26. See FIG. 4. Thus, by adding or removing spacers 34 from the top of lug 36, the height of upper end 21 of pedal stop 20 above floorboard 18 can be raised or lowered to decrease or increase, respectively, the mowing speed permitted for mower 4. If desired, some type of lock (not shown) could be used on pedal stop 20 to lock pedal stop 20 in an adjusted position to prevent the mower operator from overriding the setting by lowering upper end 21 of pedal stop 20.

Various modifications of this invention will be apparent to those skilled in the art. For example, while pivotal motion of pedal stop 20 has been shown for interposing pedal stop 20 beneath forward pedal 12, other types of motion could be used, i.e. pedal stop 20 could be moved vertically or horizontally as well to place pedal stop 20 beneath forward pedal 12.

In addition, interlock system 2 could be accomplished electronically as well as mechanically. Manually actuable interlock switch 22 would still be present, but the mechanical or physical pedal stop 20 could be omitted. In this case, when switch 22 is actuated by the boss or supervisor to be disposed in the operating state thereof, the operating state of switch 22 would be signalled to a master microprocessor controller (not shown) on mower 4. Switch 22 would be connected to an input port on the master controller. Such a controller could be programmed to then disable the operation of cutting units 6 and to accept input from the accelerator 10 only up to the level needed to produce the predetermined mowing speed and to ignore or reject any accelerator settings that would produce ground speeds above the mowing speed.

Accordingly, the scope of this invention is to be limited only by the appended claims.

We claim:

1. An improved riding mower of the type comprising a frame that is self propelled by a traction drive system capable of providing a variable ground speed, a cutting unit for mowing grass which cutting unit is coupled to the frame, the traction drive system including an accelerator that is selectively movable by the operator of the riding mower to control a forward ground speed of the riding mower, the accelerator having a path of travel between a neutral position in which the forward ground speed of the riding mower is zero and a position of maximum advancement in which the forward ground speed of the riding mower is at an absolute maximum forward ground speed, wherein the improvement relates to an interlock system which comprises:

(a) an accelerator stop movably carried on the frame of the riding mower and movable between an operating position in which the accelerator stop is interposed into the path of travel of the accelerator and a non-operating position in which the accelerator stop is clear of the path of travel of the accelerator, the accelerator stop in the operating position being located to limit advancement of the accelerator to something short of the maximum advancement position to limit the forward ground speed of the riding mower to a mowing speed that is above zero but less than the absolute maximum forward ground speed; and (b) a switch adjacent the accelerator stop with the switch being responsive to and changing state as a result of the movement of the accelerator stop as the accelerator stop moves between the operating and non-operating positions of the accelerator stop, wherein the switch has an operating state when the accelerator stop is in the operating position and a non-operating state when the accelerator stop is in the non-operating position, the switch enabling operation of the cutting unit when the switch is in the operating state and disabling operation of the cutting unit when the switch is in the non-operating state.

2. The riding mower of claim 1, wherein the accelerator stop is adjustable to vary where in the path of travel of the accelerator that the accelerator stop engages against the accelerator to adjust the mowing speed provided by the accelerator stop.

3. The riding mower of claim 1, wherein the accelerator comprises a foot pedal carried on the riding mower which foot pedal is depressed by one of the operator's feet to move from the neutral position to the maximum advancement position.

4. The riding mower of claim 3, wherein at least a portion of the accelerator stop is moved beneath the foot pedal when the accelerator atop is in the operating position to engage and limit how far the foot pedal can be depressed by the operator.

5. The riding mower of claim 4, wherein the foot pedal is located above a floorboard of the riding mower and moves towards the floorboard of the riding mower as the foot pedal is depressed by the operator.

6. The riding mower of claim 5, wherein the accelerator stop in the operating position thereof projects through the floorboard.

7. The riding mower of claim 6, wherein the accelerator stop in the non-operating position thereof is located beneath the floorboard.

8. The riding mower of claim 7, wherein the accelerator stop pivots on the frame of the riding mower in moving between the operating and non-operating positions thereof.

9. The riding mower of claim 1, further including a lever secured to the accelerator stop for moving the accelerator atop between its operating and non-operating positions.

10. The riding mower of claim 9, wherein the lever projects through a slot in a floorboard of the frame with an upper end of the lever being accessible to the operator from above the floorboard at all times.

11. The riding mower of claim 9, wherein the lever is effective to change the state of the switch as the lever moves with the accelerator stop between the operating and non-operating positions of the accelerator stop.

12. The riding mower of claim 1, wherein the cutting unit is a reel cutting unit.

\* \* \* \* \*